United States Patent
Gupta (10) Patent No.: US 8,749,886 B2
(45) Date of Patent: Jun. 10, 2014

(54) WIDE-ANGLE WIDE BAND POLARIZING BEAM SPLITTER

(75) Inventor: Anurag Gupta, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 90 days.

(21) Appl. No.: 13/426,251

(22) Filed: Mar. 21, 2012

(65) Prior Publication Data

US 2013/0250415 A1 Sep. 26, 2013

(51) Int. Cl.
*G02B 5/30* (2006.01)

(52) U.S. Cl.
USPC ............ 359/489.09; 359/629; 359/630

(58) Field of Classification Search
USPC .......... 359/485.06, 489.09, 629, 630
See application file for complete search history.

(56) References Cited

U.S. PATENT DOCUMENTS

| | | | |
|---|---|---|---|
| 4,133,039 A * | 1/1979 | Eichenlaub | 376/215 |
| 4,318,027 A * | 3/1982 | Hughes et al. | 315/15 |
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,576,886 A * | 11/1996 | Ferrante | 359/630 |
| 5,696,521 A | 12/1997 | Robinson et al. | |
| 5,715,337 A | 2/1998 | Spitzer et al. | |
| 5,771,124 A | 6/1998 | Kintz et al. | |
| 5,795,047 A * | 8/1998 | Sannohe et al. | 353/81 |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,926,318 A | 7/1999 | Hebert | |
| 5,943,171 A | 8/1999 | Budd et al. | |
| 5,949,583 A | 9/1999 | Rallison et al. | |
| 5,982,541 A | 11/1999 | Li et al. | |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,285,423 B1 * | 9/2001 | Li et al. | 349/96 |

(Continued)

FOREIGN PATENT DOCUMENTS

GB 2 272 980 A 6/1994
WO WO 96/05533 A1 2/1996

OTHER PUBLICATIONS

Levola, T., "Diffractive Optics for Virtual Reality Displays", Academic Dissertation, Joensuu 2005, University of Joensuu, Department of Physics, Vaisala Laboratory, 26 pages.

(Continued)

*Primary Examiner* — Frank Font
(74) *Attorney, Agent, or Firm* — Blakely Sokoloff Taylor & Zafman LLP (57) ABSTRACT

A beamsplitter that includes a first prism including an input face, an output face and an oblique face and a second prism including an output face and an oblique face, the oblique face of the second prism being coupled to the oblique face of the first prism. A polarizing coating is sandwiched between the oblique face of the first prism and the oblique face of the second prism, and a linear polarizer coupled to at least one of the output face of the first prism and the output face of the second prism.

24 Claims, 9 Drawing Sheets

(56) References Cited

U.S. PATENT DOCUMENTS

| | | | |
|---|---|---|---|
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,392,801 B1* | 5/2002 | Southwell | 359/485.03 |
| 6,529,331 B2* | 3/2003 | Massof et al. | 359/630 |
| 6,538,799 B2 | 3/2003 | McClelland et al. | |
| 6,563,638 B2* | 5/2003 | King et al. | 359/485.03 |
| 6,609,795 B2* | 8/2003 | Weber et al. | 353/20 |
| 6,618,099 B1 | 9/2003 | Spitzer | |
| 6,690,516 B2 | 2/2004 | Aritake et al. | |
| 6,701,038 B2 | 3/2004 | Rensing et al. | |
| 6,724,354 B1 | 4/2004 | Spitzer et al. | |
| 6,738,535 B2 | 5/2004 | Kanevsky et al. | |
| 6,747,611 B1 | 6/2004 | Budd et al. | |
| 6,829,095 B2 | 12/2004 | Amitai | |
| 6,879,443 B2 | 4/2005 | Spitzer et al. | |
| 6,926,410 B2* | 8/2005 | Weber et al. | 353/20 |
| 6,992,748 B2* | 1/2006 | Koh et al. | 349/196 |
| 7,035,491 B2* | 4/2006 | Little | 385/11 |
| 7,057,814 B2* | 6/2006 | Boyd et al. | 359/485.03 |
| 7,158,096 B1 | 1/2007 | Spitzer | |
| 7,234,816 B2* | 6/2007 | Bruzzone et al. | 353/20 |
| 7,242,527 B2 | 7/2007 | Spitzer et al. | |
| 7,391,573 B2 | 6/2008 | Amitai | |
| 7,457,040 B2 | 11/2008 | Amitai | |
| 7,499,217 B2* | 3/2009 | Cakmakci et al. | 359/630 |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,843,403 B2 | 11/2010 | Spitzer | |
| 7,900,068 B2 | 3/2011 | Weststrate et al. | |
| 8,004,765 B2 | 8/2011 | Amitai | |
| 2001/0046086 A1* | 11/2001 | Wheatley et al. | 359/494 |
| 2002/0075479 A1* | 6/2002 | Peck et al. | 356/327 |
| 2003/0090439 A1 | 5/2003 | Spitzer et al. | |
| 2004/0114237 A1* | 6/2004 | Sedlmayr | 359/485 |
| 2004/0227994 A1* | 11/2004 | Ma et al. | 359/487 |
| 2005/0001983 A1 | 1/2005 | Weber et al. | |
| 2005/0174651 A1 | 8/2005 | Spitzer et al. | |
| 2006/0192306 A1 | 8/2006 | Giller et al. | |
| 2006/0192307 A1 | 8/2006 | Giller et al. | |
| 2007/0085972 A1 | 4/2007 | Tan et al. | |
| 2008/0219025 A1 | 9/2008 | Spitzer et al. | |
| 2009/0122414 A1 | 5/2009 | Amitai | |
| 2010/0033816 A1* | 2/2010 | DiZio et al. | 359/495 |
| 2010/0046070 A1 | 2/2010 | Mukawa | |
| 2010/0103078 A1 | 4/2010 | Mukawa et al. | |
| 2010/0135038 A1* | 6/2010 | Handschy et al. | 362/606 |
| 2010/0149073 A1 | 6/2010 | Chaum et al. | |
| 2010/0202048 A1* | 8/2010 | Amitai et al. | 359/487 |
| 2010/0278480 A1 | 11/2010 | Vasylyev | |
| 2011/0123765 A1* | 5/2011 | Arai et al. | 428/137 |
| 2011/0164221 A1* | 7/2011 | Tilleman et al. | 353/20 |
| 2011/0213664 A1 | 9/2011 | Osterhout et al. | |
| 2012/0008096 A1 | 1/2012 | Magarill et al. | |
| 2012/0154805 A1* | 6/2012 | Holzapfel | 356/365 |
| 2013/0033593 A1* | 2/2013 | Chinnock et al. | 348/78 |

OTHER PUBLICATIONS

Mukawa, H. et al., "8.4: Distinguished Paper: A Full Color Eyewear Display using Holographic Planar Waveguides", SID Symposium Digest of Technical Papers, 2008, vol. 39, Issue 1, pp. 89-92.

PCT/US2013/029937—International Search Report and Written Opinion, mailed Jun. 27, 2013 (11 pages).

* cited by examiner

| Layer | Material | Refractive Index | Physical Thickness (nm) |
|---|---|---|---|
| Prism | BK 7 | 1.51854 | |
| 1 | ZrO2 | 2.05731 | 134.69 |
| 2 | SiO2 | 1.45992 | 150.27 |
| 3 | ZrO2 | 2.05731 | 121.87 |
| 4 | SiO2 | 1.45992 | 138.37 |
| 5 | ZrO2 | 2.05731 | 97.99 |
| 6 | SiO2 | 1.45992 | 170.99 |
| 7 | ZrO2 | 2.05731 | 87.53 |
| 8 | SiO2 | 1.45992 | 134.83 |
| 9 | ZrO2 | 2.05731 | 89.30 |
| 10 | SiO2 | 1.45992 | 181.43 |
| 11 | ZrO2 | 2.05731 | 73.89 |
| 12 | SiO2 | 1.45992 | 69.56 |
| 13 | ZrO2 | 2.05731 | 51.92 |
| 14 | SiO2 | 1.45992 | 99.24 |
| 15 | ZrO2 | 2.05731 | 103.42 |
| 16 | SiO2 | 1.45992 | 179.42 |
| 17 | ZrO2 | 2.05731 | 57.20 |
| 18 | SiO2 | 1.45992 | 79.43 |
| 19 | ZrO2 | 2.05731 | 54.05 |
| 20 | SiO2 | 1.45992 | 101.71 |
| 21 | ZrO2 | 2.05731 | 63.11 |
| 22 | SiO2 | 1.45992 | 97.31 |
| 23 | ZrO2 | 2.05731 | 51.13 |
| 24 | SiO2 | 1.45992 | 86.31 |
| 25 | ZrO2 | 2.05731 | 56.60 |
| 26 | SiO2 | 1.45992 | 97.55 |
| 27 | ZrO2 | 2.05731 | 49.88 |
| 28 | SiO2 | 1.45992 | 78.52 |
| 29 | ZrO2 | 2.05731 | 53.55 |
| 30 | SiO2 | 1.45992 | 98.72 |
| 31 | ZrO2 | 2.05731 | 48.13 |
| 32 | SiO2 | 1.45992 | 61.36 |
| 33 | ZrO2 | 2.05731 | 56.42 |
| 34 | SiO2 | 1.45992 | 302.99 |
| 35 | ZrO2 | 2.05731 | 44.96 |
| 36 | SiO2 | 1.45992 | 59.68 |
| 37 | ZrO2 | 2.05731 | 29.71 |
| Prism | BK7 | 1.51854 | |
| | | Total: | 3513.04 |

WIDE-ANGLE WIDE BAND POLARIZING BEAM SPLITTER

TECHNICAL FIELD

The present invention relates generally to beamsplitters and in particular, but not exclusively, to a wide-angle wide band polarizing beam splitter made with low index materials.

BACKGROUND

A beamsplitter is an optical component found in many types of optical device. As its name implies, a beamsplitter splits an input light beam into two or more output light beams. Polarization beam splitters (PBSs) are a particular type of beam splitter that can split an input light beam into two or more output light beams based on polarization, such that each output light beam has a different polarization. For example, a PBS can receive an input beam having both p-polarized and s-polarized light and split it into two separate output beams—one p-polarized, the other s-polarized. With an input beam that is already either p-polarized or s-polarized, a PBS can also be used to selectively pass or reflect the polarized input beam. In many existing PBSs, the output beams have low contrast—that is, in each output beam the ratio of the undesired polarization to the desired polarization is higher than desired. Put differently, low contrast means that the output beams have too little of the desired polarization.

High-contrast PBSs exist, but they suffer from several shortcomings. They must be made of optical materials having a very high refractive index (e.g., greater than 1.7); in one example, SF11 glass with a refractive index of 1.78 can be used. But high-index materials such as SF11 are expensive and heavy due to density being proportional to index, meaning that the resulting beamsplitters, as well as optical devices that use these beam splitters, are also expensive and heavy. Moreover, there are few index-matching optical adhesives that can be used to join the high-index materials that make up the PBS with good bond strength, meaning that rugged and durable high-contrast PBSs are difficult to manufacture. Finally, existing high-contrast PBSs are optimized for only a very narrow angle of incidence across a wavelength band. For example, in some PBSs high-contrast output (less than 0.5% of undesired polarization, for instance) is possible only for a narrow range of incidence angles (less than 1°) across a wavelength band from 450 nm-650 nm. Many high-contrast PBSs also exhibit angle-dependent splitting, which leads to non-uniformity of color across the field of view of the output.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified. Figures are not drawn to scale unless otherwise noted.

DETAILED DESCRIPTION OF THE ILLUSTRATED EMBODIMENTS

Embodiments of an apparatus, system and method for a wide-angle wide band beamsplitter made with low index glass are described. Numerous specific details are described to provide a thorough understanding of the embodiments, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
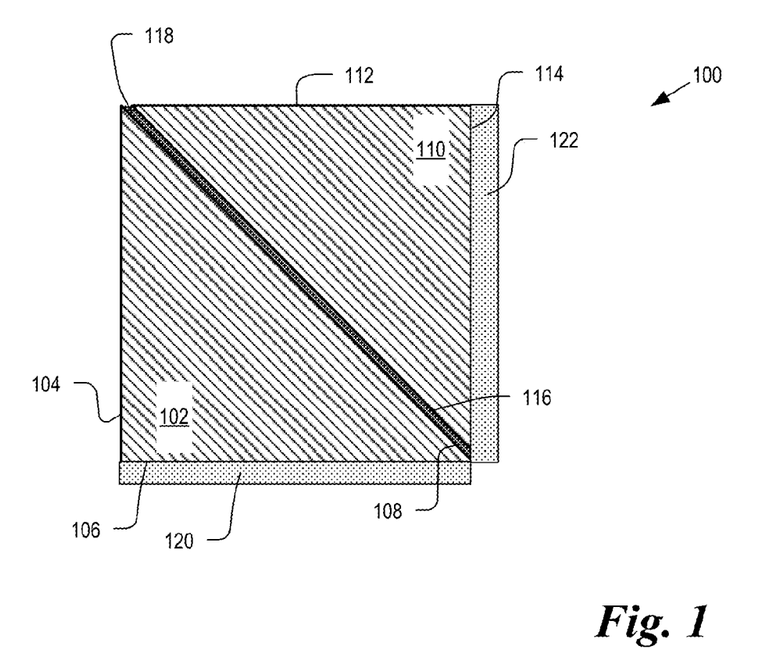
FIG. 1 is a cross-sectional view of an embodiment of a beam splitter.

FIG. 1 illustrates an embodiment of a polarizing beam splitter (PBS) 100. PBS 100 is a volumetric shape with a square cross-section and includes a first prism 102 coupled to a second prism 110. First prism 102 has an input face 104, an output face 106, and an oblique face 108, while second prism 110 has a face 112, an output face 114, and an oblique face 116. A polarizing coating 118 is sandwiched between oblique face 108 of first prism 102 and oblique face 116 of second prism 110. A linear polarizer 120 is coupled to output face 106 of first prism 102, and a polarizing coating 122 is coupled to output face 114 of second prism 110.

In the illustrated embodiment, first prism 102 and second prism 110 have cross sections in the shape of a 90/45/45 isosceles right triangle in which the prism faces that subtend the right angle are equal in length and the three angles of the triangle are substantially 90 degrees, 45 degrees and 45 degrees, but in other embodiments other right triangle configurations such as 90/60/30 can be used. Other embodiments can also use triangles that are not right triangles, and still other embodiments can use cross-sectional shapes besides triangles.

In one embodiment, first prism 102 and second prism 110 can be made of a low-index glass such as BK7, which has a refractive index of 1.52 at a wavelength of 550 nm, but in other glass embodiments other types of glass can be used. In another embodiment, first prism 102 and second prism 110 can be made of a plastic material. Examples of plastic materials that can be used include polycarbonate, optical-grade acrylic, Zeonex-E48R, and poly-methyl-methacrylate (PMMA). In the illustrated embodiment, first prism 102 and second prism 110 are made of the same material, but in other embodiments they need not be, provided their refractive indices can be matched in the wavelength range of interest. First prism 102 is coupled to second prism 110 using an index-matched optical adhesive placed between polarizing coating 118 and oblique face 116, such that polarizing coating 118 is sandwiched between oblique face 108 and oblique face 116. The exact optical adhesive used in a particular embodiment will depend on the material from which the prisms are made in that embodiment.

Polarizing coating 118 is formed on oblique face 108 of first prism 102. In one embodiment, polarizing layer 118 is a multi-layer coating designed to produce high contrast polarization separation over a wide waveband (i.e., a band of wavelengths, for example 450-650 nm in one embodiment, although other embodiments can use different wavelength ranges) and over a wider range of angles of incidence θ than currently available (45°+/−8° in one embodiment, although other embodiments can have different angular ranges). In other embodiments other types of polarizers can be used instead of polarizing coating 118, such as a wire grid polarizer or commercially available linear polarizers based on layers of birefringent materials such as APF films available from the 3M Corporation of Minneapolis, Minn. Details of embodiments of a multi-layer polarizing coating 118 are discussed below in connection with FIGS. 2A-2B.

Linear polarizer 120 is coupled to output face 106 of first prism 102, and is oriented to pass the desired polarization while filtering out undesired polarization; in an embodiment in which PBS 100 is a s-reflect, p-pass beam splitter, linear polarizer 120 will be oriented to pass s-polarized light while filtering out p-polarized light. Linear polarizer 122 is similarly coupled to output face 114 of second prism 110 and is oriented to pass the desired polarization while filtering out undesired polarization; in a s-reflect, p-pass beam splitter, linear polarizer 122 will be oriented to pass p-polarized light while filtering out s-polarized light. In one embodiment, linear polarizer 120 and linear polarizer 122 can be linear polarizers of the same material, but can be oriented differently to filter out different polarizations. For example, in one embodiment first linear polarizer 120 and second linear polarizer 122 can be a linear polarizing coating such as one made by the Sanritz Corporation of Japan. In other embodiments, however, linear polarizer 120 can be of a different material than linear polarizer 122. Linear polarizers 120 and 122 can be coupled to their respective output faces using an optical adhesive.

Figure 2A:
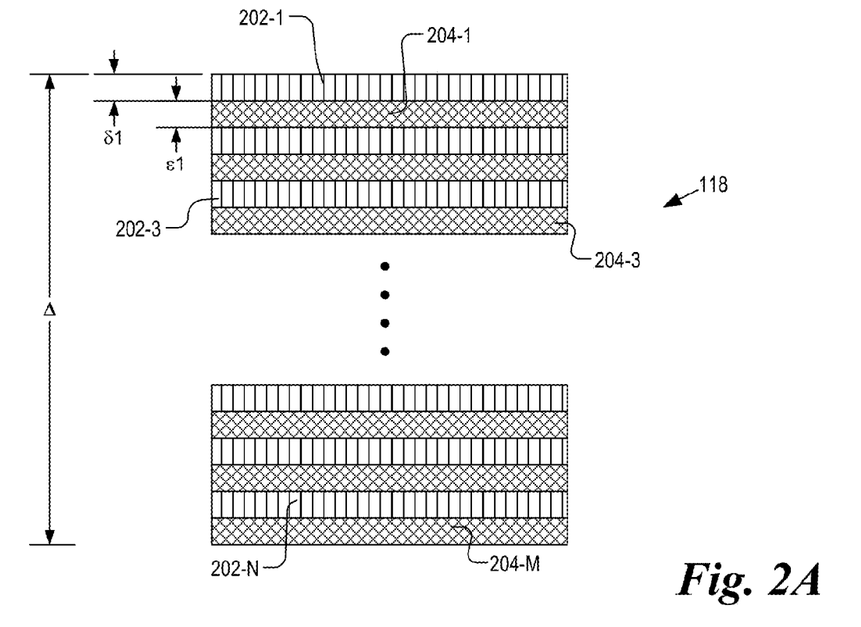
FIG. 2A is a cross-sectional drawing of an embodiment of a polarization coating that can be used in a beamsplitter such as the one shown in FIG. 1.
Figure 2B:
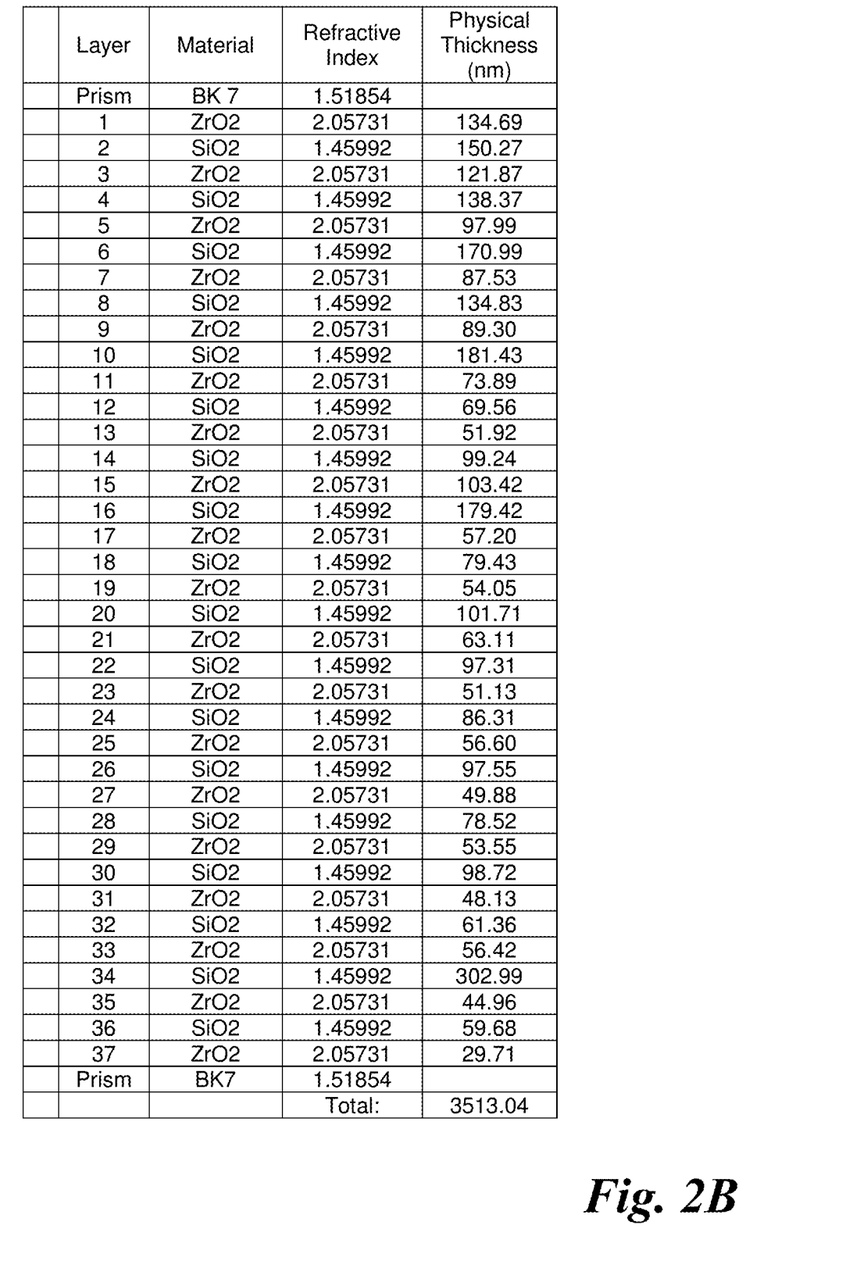
FIG. 2B is a table of details of an embodiment of a polarization coating such as the one shown in FIG. 2A.

FIGS. 2A-2B illustrate embodiments of a polarizing coating 118. Polarizing layer 118 is a multi-layer coating designed to produce wavelength independent transmission of p-polarized light and wavelength independent reflection of s-polarized light over wide a wider range of angles of incidence θ than currently available. As a result, the efficiency (product of reflectance of s-polarized light and the transmittance of p-polarized light) of the polarization beam splitter is substantially flat across the waveband for the desired angles of incidence θ. Such performance is achieved by trading off high polarization contrast in the split beams and the polarizing beam splitter efficiency. High contrast is recovered by using a high-extinction linear polarizer to pass the predominant polarization in reflection or transmission. That is, polarizing coating 118 is designed to separate the incident light beam with adequate polarization contrast, but in some embodiments, at higher angles of incidence θ lower-than-optimum polarization contrast at separation can be tolerated because a substantial amount of contrast can be recovered when the separated (transmitted and reflected) beams pass through their respective linear polarizers. The net effect of the tradeoff is that PBS 100 provides uniformly high contrast polarization beam splitting over a wide band of wavelengths (450-650 nm in one embodiment, although other embodiments can use different wavelength ranges) and over a wider range of angles of incidence θ than currently available (up to 45°+/−8° in one embodiment, although other embodiments can have different angular ranges).

Polarizing coating 118 has an overall thickness Δ and includes N layers 202 of a first material and M layers 204 of a second material. Each layer 202 of first material has a thickness δ, while each layer 204 of second material has a thickness ε; thus, layer 202-1 has thickness δ1 and layer 204-1 has thickness ε1, layer 202-2 has thickness δ2 and layer 204-2 has thickness ε2, and so forth. In one embodiment all layers 202 of the first material can have the same thickness δ and all layers 204 of the second material can have the same thickness ε, but in other embodiments different layers 202 can have different thickness, as can different layers 204. Finally, the thicknesses δ of the layers of the first material 202 can be, but need not be, the same as the thicknesses ε of the layers of second material 204.

In the illustrated embodiment, the number of layers of each material is equal (N=M) but in other embodiments the number of layers of each material need not be equal, such that N need not equal M. Moreover, in the illustrated embodiment layers 202 and 204 alternate regularly, but in other embodiments other arrangement of layers is possible, including arrangements in which the different material layers alternate irregularly or arrangements in which the different material layers alternate, regularly or irregularly, in only part of the polarizing coating.

In one embodiment, the first material can be silicon oxide (nominally SiO2), while the second material can be tantalum oxide (nominally Ta2O5), but in other embodiments other materials can be used, for example zirconium oxide (nominally ZrO2). Although the illustrated embodiment uses two different materials, other embodiments can use a greater or lesser number of different materials, including materials not listed here.

FIG. 2B is a table illustrating the construction of an embodiment of polarizing layer 118 that includes alternating layers of silicon oxide and zirconium oxide. The embodiment described in the table has 37 layers and an overall thickness Δ of 3513.04 nm, or about 3.5 microns. The number of ZrO2 layers is larger than the number of SiO2 layers such that N≠M, and the different layers of ZrO2 have different thicknesses δ while different layers of SiO2 have different thicknesses ε.

Figure 3A:
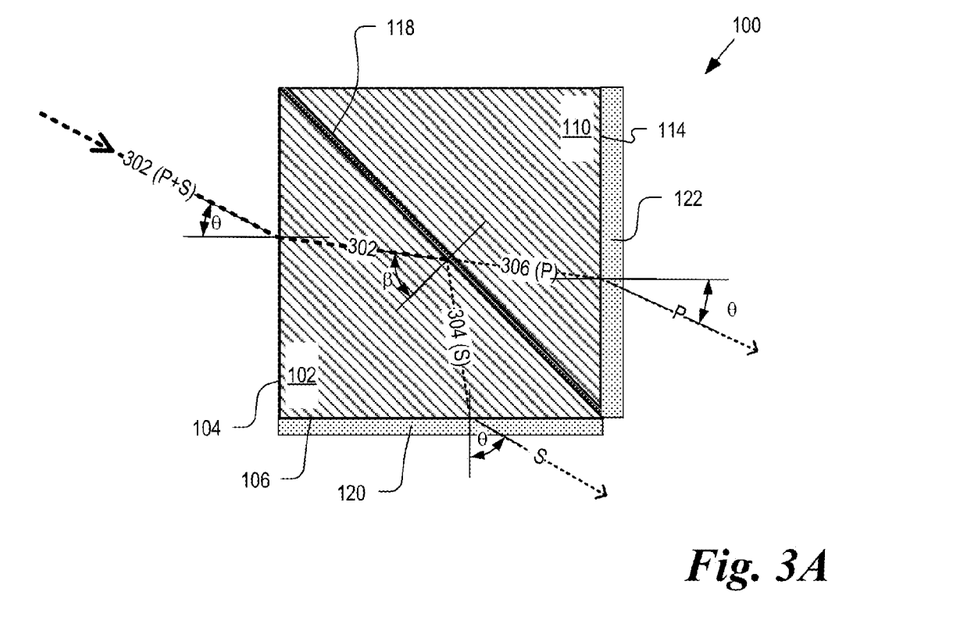
FIGS. 3A-3B are cross-sectional drawings of an embodiment of the operation of the embodiment of a beamsplitter shown in FIG. 1.
Figure 3B:
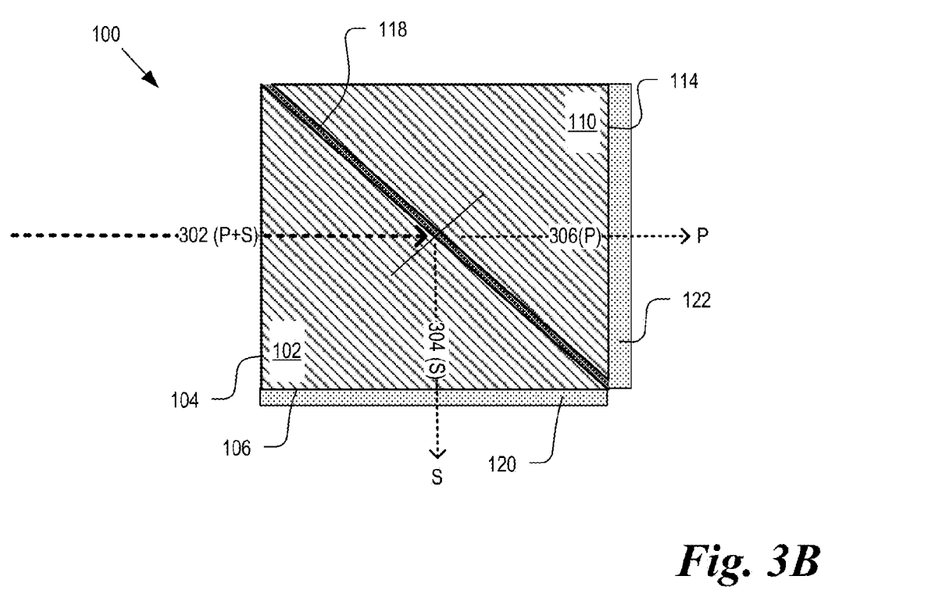

FIGS. 3A-3B illustrate an embodiment of the operation of PBS 100. In one embodiment, PBS 100 can be an s-reflect, p-pass beam splitter, meaning that it reflects s-polarized light but transmits (passes) p-polarized light. In another embodiment PBS 100 can be an s-pass, p-reflect beam splitter, meaning that it transmits (passes) s-polarized light but reflects p-polarized light. The illustrated optical paths are for an s-reflect, p-pass PBS, but the optical paths in an s-pass, p-reflect PBS would be similar, with the p-polarized and s-polarized beams swapped.

In operation, light beam 302 that has both p-polarization and s-polarization is incident upon input face 104 of PBS 100 at an angle of incidence θ relative to a normal of input face 104. Upon encountering input face 104, light ray 302 is refracted according to Snell's law and directed through first prism 102 toward polarizing coating 118, on which it will be incident at an angle of incidence β. Upon encountering polarizing coating 118, beam 302 is split into two separate beams: s-polarized beam 304 and p-polarized beam 306. In some embodiments, at higher angles of incidence θ, lower-than-optimum polarization contrast in s-polarized beam 304 and p-polarized beam 306 can be tolerated because a substantial amount of contrast can be recovered when these beams pass through their respective linear polarizers.

The s-polarized beam 304 is reflected by polarizing coating 118 through first prism 102 toward output face 106. Upon encountering output face 106, s-polarized beam 304 is refracted such that it exits output face 106 at an angle θ that makes it substantially parallel to input beam 302. Upon exiting output face 106, s-polarized beam 304 is filtered by linear polarizer 120 to remove p-polarization from the beam, meaning that the beam emerges from PBS 100 with substantially higher contrast. The tradeoff of lower-than-optimum polarization contrast in s-polarized beam 304 after separation at polarizing coating 118 for high angles of incidence θ over a waveband can be tolerated because a substantial amount of contrast can be recovered at linear polarizer 120. The net result is that after exiting linear polarizer 120, s-polarized beam 304 has high contrast over a wide band of wavelengths (450-650 nm in one embodiment, although other embodiments can use different wavelength ranges) and over a wider range of angles of incidence θ (up to 45°+/−8° about the optical axis in one embodiment, although other embodiments can have different angular ranges).

After being split off from incident beam 302 at polarizing coating 118, p-polarized beam 306 is transmitted through polarizing coating 118 and second prism 110 until it reaches output face 114, where the beam is refracted such that it exits from output face 114 at an angle θ that makes it substantially parallel to input beam 302. After exiting output face 114, p-polarized beam 306 is filtered by linear polarizer 122 to remove s-polarization, meaning that p-polarized beam 306 emerges from PBS 100 with substantially higher contrast. The tradeoff of lower-than-optimum polarization contrast in p-polarized beam 306 after separation at polarizing coating 118 for high angles of incidence θ over a waveband can be tolerated because a substantial amount of contrast can be recovered at linear polarizer 122. The net result is that after exiting linear polarizer 122, p-polarized beam 306 has high contrast over a wide band of wavelengths (450-650 nm in one embodiment, although other embodiments can use different wavelength ranges) and over a wider range of angles of incidence θ (up to 45°+/−8° in one embodiment, although other embodiments can have different angular ranges). FIG. 3B illustrates the optical paths of the beams for the special case where the angle of incidence θ is substantially zero.

Figure 3C:
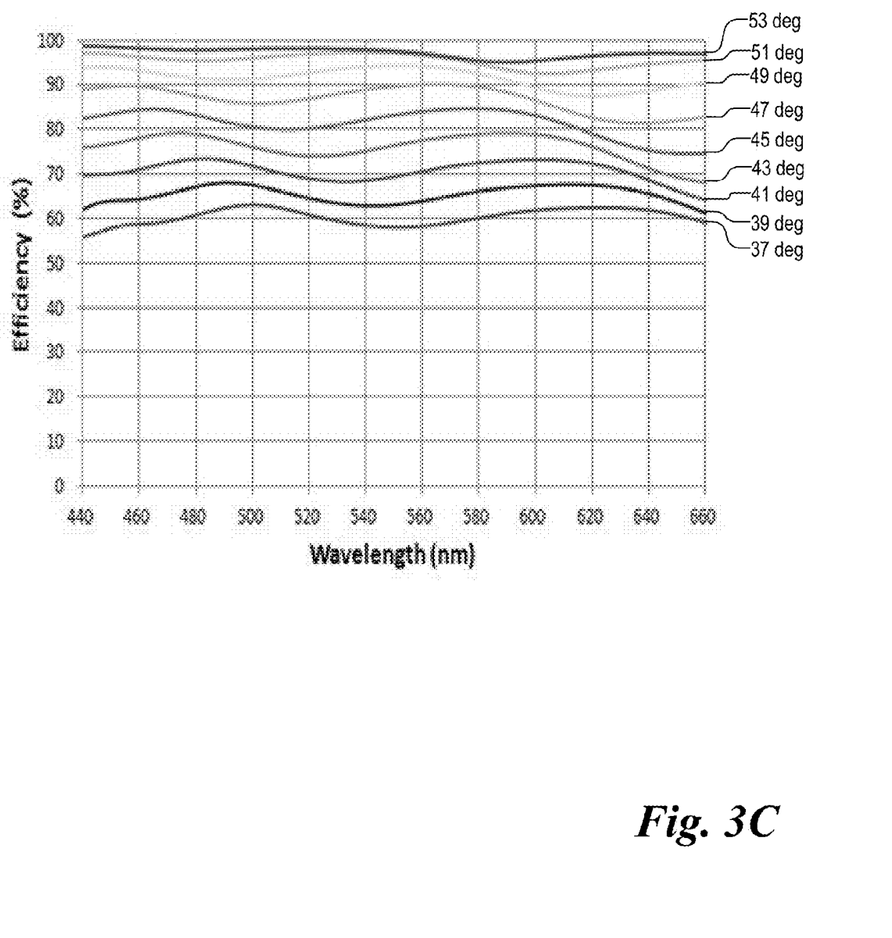
FIG. 3C is a graph illustrating an embodiment of the operation of the beamsplitter shown in FIG. 1.

FIG. 3C shows the efficiency (product of reflectance of s-polarized light and the transmittance of p-polarized light) of polarization beam splitter 100. The efficiency is substantially flat over the desired waveband (450-650 nm in this embodiment, although other embodiments can use a different waveband) for angles of incidence θ in the range of 37°-53°. To increase the angular range of the performance (high contrast with substantially flat efficiency over the waveband), the polarization beam efficiency can be further traded off while maintaining the polarization contrast trade off and recovering the polarization contrast with the use of linear polarizers.

Because of its operation, PBS 100 provides color-independent high-contrast output in both transmission and reflection at a substantially larger range of angles of incidence θ and over a range of wavelengths. For example, in one embodiment PBS 100 can provide color-independent output contrast of less than 0.1% of undesired polarization over a wavelength range of 450 nm-650 nm at incidence angles θ up to 45°+/−8° in one embodiment, although other embodiments can have different angular ranges and/or different wavelength ranges. Because PBS 100 is manufactured with low-index materials, such as BK7 in one glass embodiment, many index-matching optical adhesives are available and a rugged, durable PBS 100 can be manufactured cheaply and easily. Moreover, low-index glass and plastic materials are several times lighter than a high-index materials like SF11, meaning that they produce a lighter PBS, as well as lightening whatever device the PBS is used in. PBS 100 also does not suffer from the color distortion due to angularly variable separation.

Figure 4:
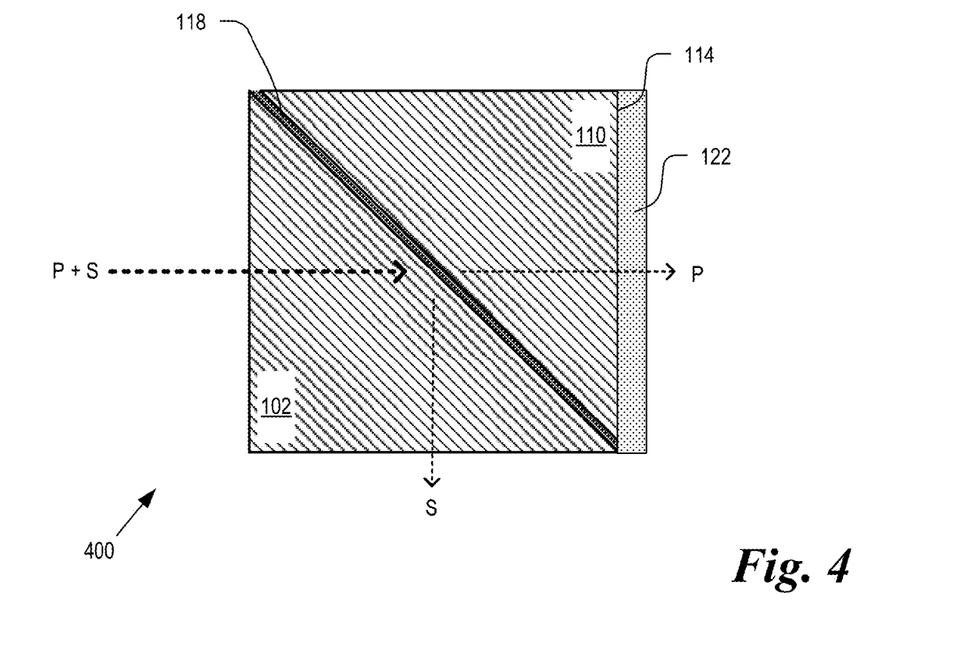
FIG. 4 is a cross-sectional view of another embodiment of a beamsplitter.

FIG. 4 illustrates another embodiment of a PBS 400. PBS 400 is similar in most respects to PBS 100. The primary difference between PBS 400 and PBS 100 is that PBS 400 omits linear polarizer 120 and only has linear polarizer 122. In an embodiment in which PBS 500 is a p-pass, s-reflect PBS, PBS 400 can be useful in applications where high contrast is needed only in the p-polarized output.

Figure 5:
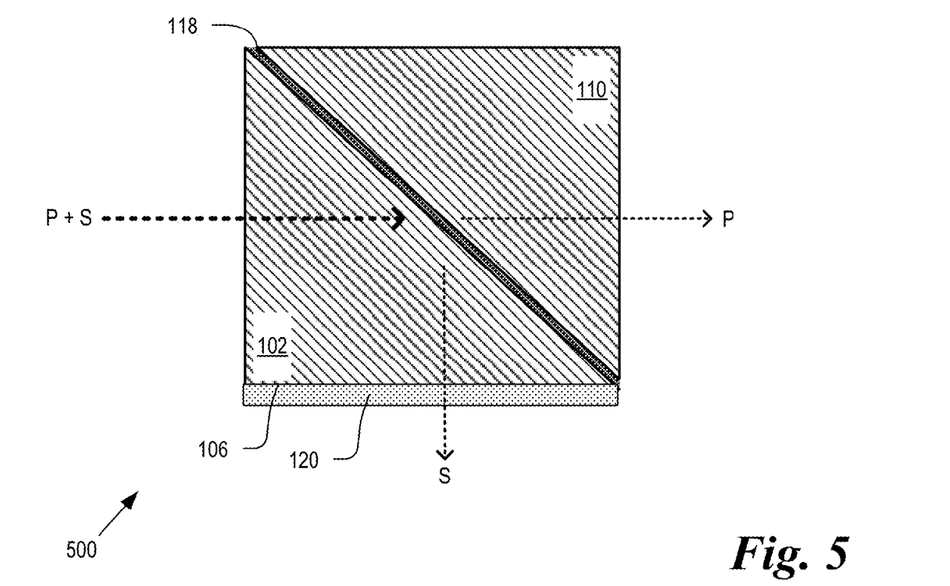
FIG. 5 is a cross-sectional view of another embodiment of a beamsplitter.

FIG. 5 illustrates another embodiment of a PBS 500. PBS 500 is similar in most respects to PBS 100. The primary difference between PBS 500 and PBS 100 is that PBS 500 omits linear polarizer 122 and only has linear polarizer 120. In an embodiment in which PBS 500 is a p-pass, s-reflect PBS, PBS 500 can be useful in applications where high contrast is needed only in the s-polarized output.

Figure 6:
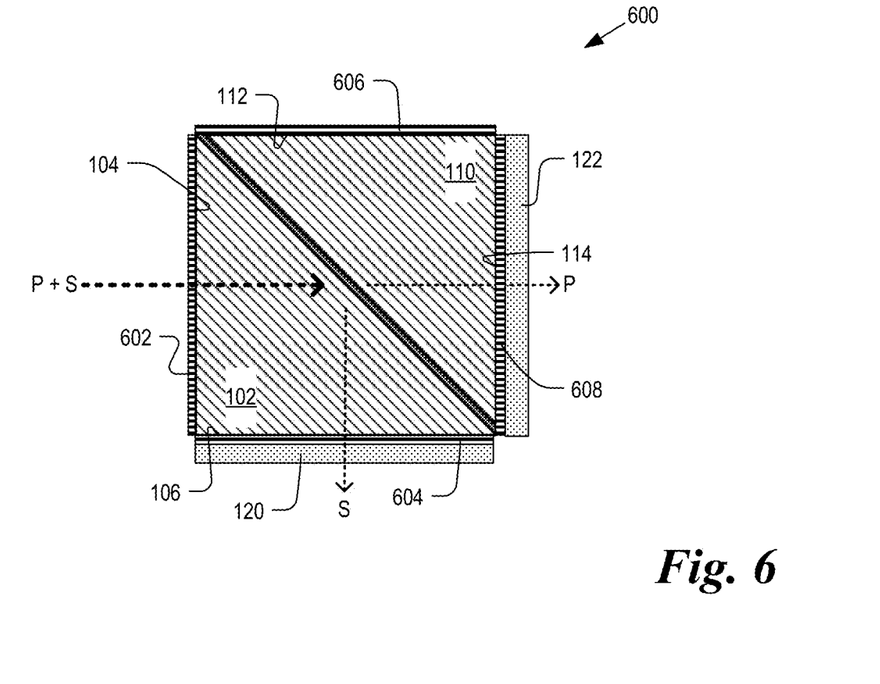
FIG. 6 is a cross-sectional view of another embodiment of a beamsplitter.

FIG. 6 illustrates another embodiment of a PBS 600. PBS 600 shares many features with PBS 100. The primary difference between PBS 600 and PBS 100 is that PBS 600 includes antireflective coatings on one or more of its faces. In the illustrated embodiment, antireflective coating 602 is formed on input face 104, antireflective coating 604 is formed on output face 106, antireflective coating 606 is formed on face 112, and antireflective coating 608 is formed on output face 114. In the particular case of antireflective coatings 604 and 608, the antireflective coating is sandwiched between the respective output face and the linear polarizer. Although the illustrated embodiment shows antireflective films on all faces, other embodiments can include antireflective coating on less than all faces and still other embodiments can include no antireflective coatings at all.

Figure 7A:
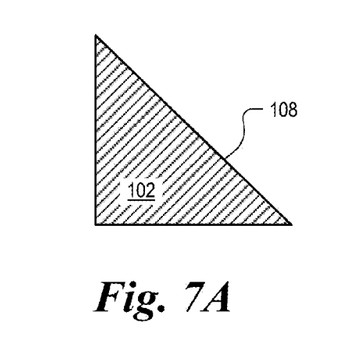
FIGS. 7A-7F are cross-sectional views of an embodiment of process for manufacturing the embodiment of a beamsplitter shown in FIG. 1.
Figure 7B:
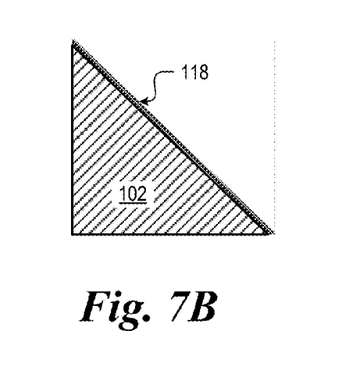
Figure 7C:
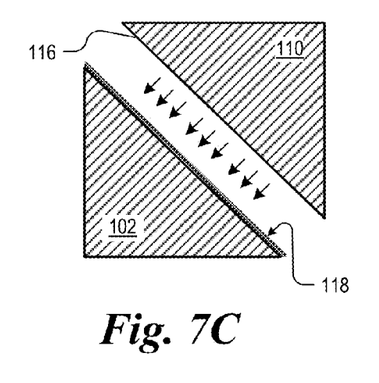
Figure 7D:
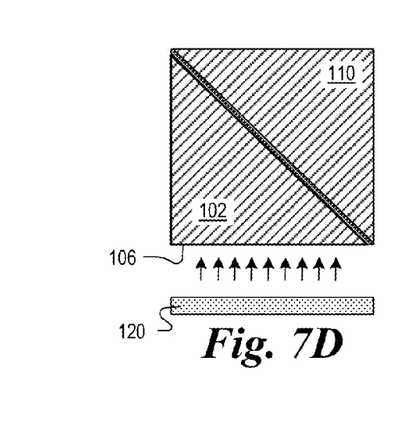
Figure 7E:
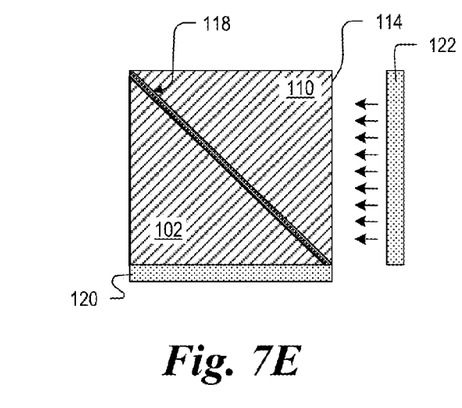
Figure 7F:
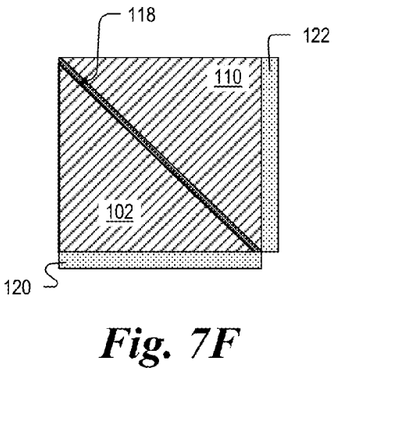

FIGS. 7A-7F illustrate an embodiment of a process for assembling PBS 100, but the assembly process would be similar for the other disclosed PBSs. The process begins at FIG. 7A with first prism 102 having oblique face 108. In FIG. 7B, polarizing coating 118 is formed on oblique face 108, and in FIG. 7C second prism 110 is coupled to first prism 102 by coupling oblique face 116 to polarizing coating 118 using an index-matched optical adhesive, such that polarizing coating 118 is sandwiched between oblique face 108 and oblique face 116. In FIG. 7D linear polarizer 120 is attached to output face 106 using optical adhesives, and in FIG. 7E linear polarizer 122 is attached to output face 114 also using optical adhesives. FIG. 7F illustrates the conclusion of the process, which is a completed PBS 100.

Figure 8:
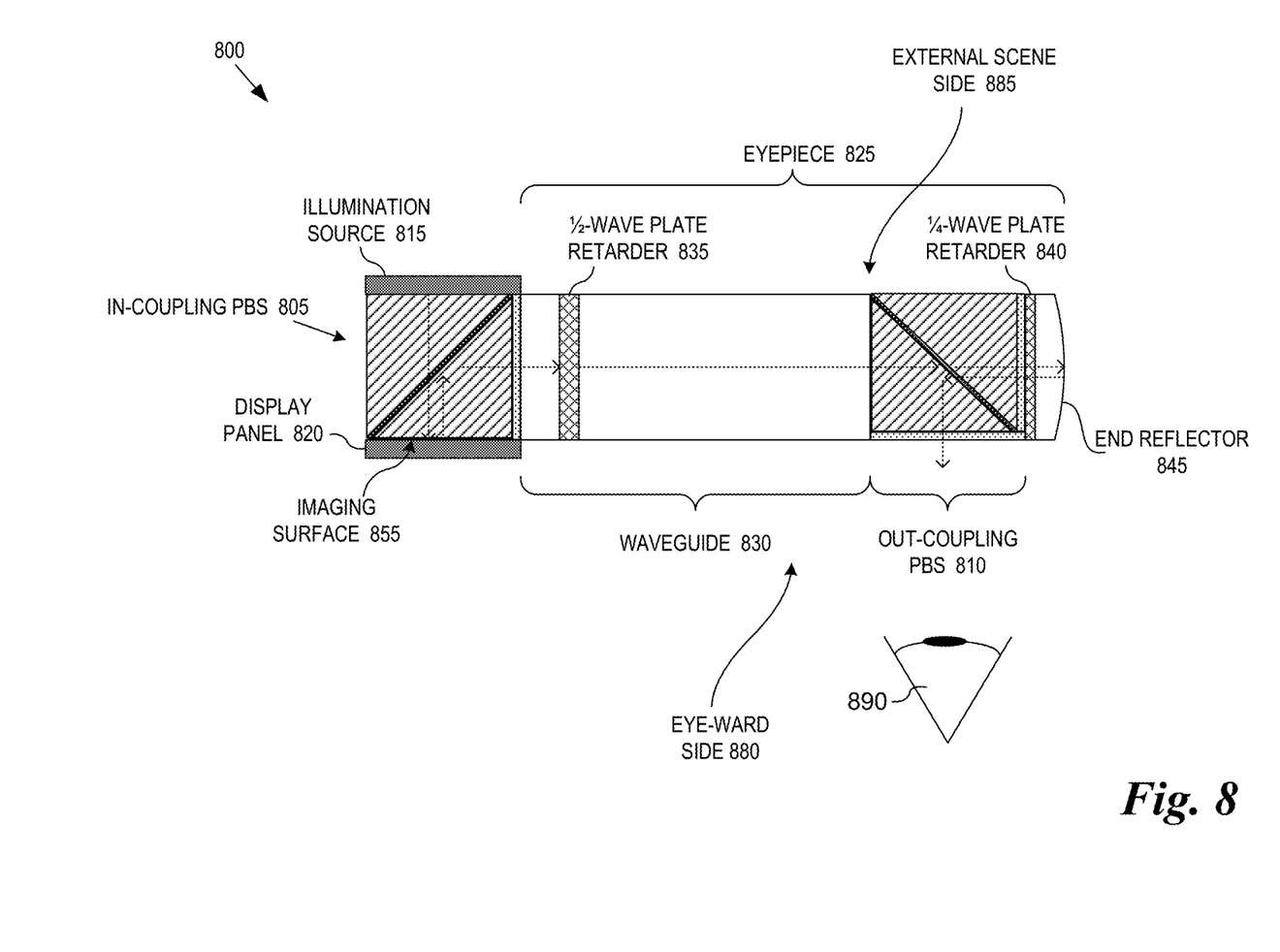
FIG. 8 is a cross-sectional view of an embodiment of a heads-up display using the beamsplitter embodiments of FIGS. 1 and 4.

FIG. 8 is a cross-sectional diagram illustrating a heads-up display 800 including an in-coupling PBS 805 and out-coupling PBS 810. In-coupling PBS 805 can be implemented using embodiments of PBS 500 illustrated in FIG. 5 and out-coupling PBS 810 can be implemented using embodiments of PBS 100 illustrated in FIG. 1. The illustrated embodiment of heads-up display 800 includes in-coupling PBS 805, an illumination source 815, a display panel 820, and an eyepiece 825. The illustrated embodiment of eyepiece 825 includes a waveguide 830, out-coupling PBS 810, a half-wave plate retarder 835, a quarter-wave plate retarder 840, and end reflector 845.

Illumination source 815 generates lamp light used to illuminate display panel 820, which modules image data onto the lamp light to create image light or computer-generated image light. The lamp light generated by illumination source 815 is launched into in-coupling PBS 805. In one embodiment, in-coupling PBS 805 is a p-pass, s-reflect PBS. The light emitted by illumination source 815 can be pre-polarized (e.g., p-polarized) or unpolarized light. In either case, the p-polarized components pass through in-coupling PBS 805 to illuminate display panel 820 while most of any remaining s-polarized portions are reflected back (e.g., towards the left in FIG. 8).

Display panel 820 (e.g., liquid crystal on silicon panel, digital micro-mirror display, etc.) imparts image data onto the lamp light via selective reflection by an array of reflective pixels. In an embodiment using an LCOS panel, reflection by display panel 820 rotates the polarization of the incident lamp light by 90 degrees. Upon reflection of the incident lamp light, the image light (which has been rotated in polarization by 90 degrees to be, for example, s-polarized) is directed back into in-coupling PBS 805 through an imaging surface 855. The now s-polarized image light is reflected by in-coupling PBS 805 and enters into waveguide 830.

The image light propagates down waveguide 830 along a forward propagation path towards out-coupling PBS 810. The length of waveguide 830 can be selected based upon the temple-eye separation of the average adult and such that the focal plane of end reflector 845 substantially coincides with imaging surface 855, which corresponds with the emission aperture of display panel 820. To achieve focal plane alignment with the emission aperture of display panel 820, both the length of waveguide 830 and the radius of curvature of end reflector 845 can be selected in connection with each other.

In the illustrated embodiment, waveguide 830 includes a half-wave plate retarder 835 within the forward propagation path of the image light. Half-wave plate retarder 835 rotates the polarization of image light by 90 degrees (e.g., it converts the s-polarized light back to p-polarized light).

In the illustrated embodiment, out-coupling PBS 810 passes the image light propagating along the forward propagation path to quarter-wave plate retarder 840. After passing through quarter-wave plate retarder 840, the image light is reflected back along a reverse propagation path back towards the out-coupling PBS 810. Thus, the image light is rotated a total of 90 degree in polarization during its double pass through quarter-wave plate retarder 840 and is s-polarized by the time it strikes the multi-layer polarizing coating within out-coupling PBS 810 on the reverse propagation path.

In one embodiment, end reflector 845 both reflects and collimates the image light such that the image light traveling along the reverse propagation path is substantially collimated. Collimating (or nearly collimating) the image light helps brings the image into focus for near-to-eye configurations (e.g., eyepiece 825 placed within 10 cm of an eye and typically less than 5 cm of an eye). The image light is directed out eye-ward side 880 towards the user's eye 890.

Out-coupling PBS 810 is partially transparent to external light received through external scene side 885, since it passes one linear polarization component. In one embodiment, heads-up display 800 facilitates an augmented reality (AR) where the image light is superimposed over external scene light. In another embodiment, eyepiece 825 can be substantially opaque or selectively opaque, which facilitates a virtual reality (VR) that immerses the user in the virtual environment displayed by the image light or provides greater image contrast.

Figure 9:
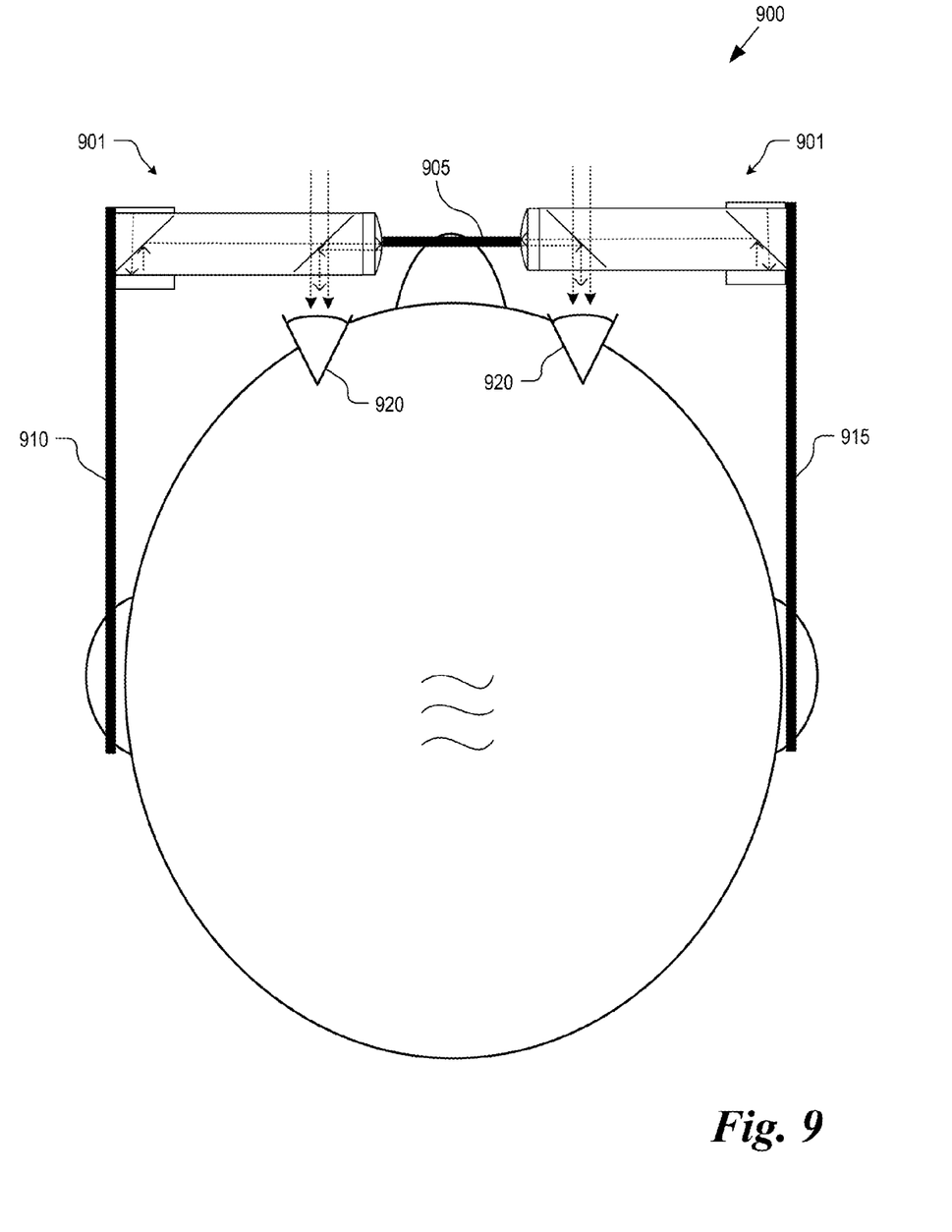
FIG. 9 is a top-view cross-sectional drawing of an embodiment of a heads-up display.

FIG. 9 illustrates an embodiment of a heads-up display 900 implemented as a pair of eyeglasses in which the eyeglass lens functions as the light guide. Heads-up display 900 includes a pair of eyepieces 901, each of which can be heads-up display such as heads-up display 700. Eyepieces 901 are mounted to a frame assembly, which includes a nose bridge 905, a left ear arm 910, and a right ear arm 915. Although the figure illustrates a binocular embodiment (two eyepieces), heads-up display 900 can also be implemented as a monocular (one eyepiece) embodiment.

Eyepieces 901 are secured into an eyeglass arrangement that can be worn on a user's head. Left and right ear arms 910 and 915 rest over the user's ears while nose assembly 905 rests over the user's nose. The frame assembly is shaped and sized to position the out-coupling PBS in front of a corresponding eye 920 of the user. Of course, other frame assemblies having other shapes may be used (e.g., a visor with ear arms and a nose bridge support, a single contiguous headset member, a headband, or goggles type eyewear, etc.).

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A process comprising:
   receiving light through an input face of a polarizing beamsplitter, wherein the light is in a selected waveband and is incident on the input face at a non-zero angle of incidence;
   splitting the received light into a first beam having substantially a first polarization and a second beam having substantially a second polarization,
   directing the first beam to a first output face of the polarizing beamsplitter and directing the second beam to a second output face of the polarizing beamsplitter;
   passing at least one of the first and second beams through an anti-reflective coating positioned on one or both of the first output face and the second output face; and
   increasing polarization contrast in at least one of the first and second beams by passing one or both of the first and second beams through a linear polarizer positioned on one or both of the first output face and the second output face.

2. The process of claim 1 wherein filtering light having the second polarization from the first beam comprises directing the first beam through a linear polarizer coupled to the first output face and oriented to only pass the first polarization.

3. The process of claim 1, further comprising filtering light having the first polarization from the second beam at the second output face.

4. The process of claim 3 wherein filtering light having the first polarization from the second beam comprises directing the second beam through a linear polarizer coupled to the second output face and oriented to only pass the second polarization.

5. The process of claim 4 wherein the first polarization is s-polarization and the second polarization is p-polarization.

6. The process of claim 4 wherein the polarizing beamsplitter comprises:
   a first prism including the input face, the first output face and an oblique face;
   a second prism including the second output face and an oblique face, the oblique face of the second prism being coupled to the oblique face of the first prism; and
   a polarizing coating sandwiched between the oblique face of the first prism and the oblique face of the second prism.

7. The process of claim 1 wherein the polarizing coating is a multi-layer coating comprising a plurality of layers.

8. The process of claim 7 wherein the plurality of coating layers includes layers of at least two different coatings.

9. The process of claim 8 wherein the at least two different coatings comprise at least two coatings selected from a group consisting of silicon oxide, tantalum oxide and zirconium oxide.

10. The process of claim 1, further comprising reducing or eliminating reflection using an anti-reflective coating on at least one of the input face, the first output face and the second output face.

11. A beamsplitter comprising:
   a first prism including an input face, an output face and an oblique face;
   a second prism including an output face and an oblique face, the oblique face of the second prism being coupled to the oblique face of the first prism;
   a polarizing coating sandwiched between the oblique face of the first prism and the oblique face of the second prism; and
   a linear polarizer coupled to at least one of the output face of the first prism and the output face of the second prism; and
   an anti-reflective coating positioned on one or both of the output face of the first prism and the output face of the second prism;
   wherein light received through the input face in a selected waveband and incident on the input face at a non-zero angle of incidence is split into two beams by the polarizing coating, wherein polarization contrast is increased in at least one of the two beams when it passes through the linear polarizer.

12. The beamsplitter of claim 11 wherein the linear polarizer comprises:
   a first linear polarizer coupled to the output face of the first prism and oriented to pass s-polarized light; and
   a second linear polarizer coupled to the output face of the second prism and oriented to pass p-polarized light.

13. The beamsplitter of claim 11 wherein the linear polarizer coupled to the output face of the first prism is of the same material as the linear polarizer coupled to the output face of the second prism.

14. The beamsplitter of claim 11 wherein the polarizing coating is a multi-layer coating comprising a plurality of coating layers.

15. The beamsplitter of claim 14 wherein the plurality of coating layers includes layers of at least two different coatings.

16. The beamsplitter of claim 15 wherein the at least two different coatings comprise at least two coatings selected from a group consisting of silicon oxide, tantalum oxide and zirconium oxide.

17. The beamsplitter of claim 11 wherein the first prism and the second prism are formed of glass.

18. The beamsplitter of claim 11 wherein the first prism and the second prism are formed of plastic.

19. The beamsplitter of claim 11 wherein at least the input face of the first prism is coated with an anti-reflective coating.

20. A heads-up display comprising:
   a first polarizing beam splitter including:
      a first prism including an input face, an output face and an oblique face,
      a second prism including an output face and an oblique face, the oblique face of the second prism being coupled to the oblique face of the first prism,
      a polarizing coating sandwiched between the oblique face of the first prism and the oblique face of the second prism, and
      a linear polarizer coupled to at least one of the output face of the first prism and the output face of the second prism,
      wherein light received through the input face in a selected waveband and incident on the input face at an angle of incidence is split into two beams by the polarizing coating, such that contrast lost at splitting is recovered in at least one of the two beams when it passes through the linear polarizer;
   a display optically coupled to the first polarizing beamsplitter, wherein the display can direct image light to the first polarizing beamsplitter; and
   an eyepiece optically coupled to the first polarizing beamsplitter to receive the image light and to deliver the image light to an eye when the heads-up display is worn by a user, wherein the eyepiece comprises:
      a waveguide coupled to the first polarizing beamsplitter to receive the image light from the first PBS into the waveguide and to pass the image light along a forward optical path within the waveguide,
      an out-coupling beam splitter optically coupled to the first polarizing beamsplitter and positioned at an opposite end of the waveguide as the first polarizing beamsplitter, and
      an end reflector positioned to reflect the image light back towards the out-coupling beam splitter along a reverse optical path, wherein at least a first portion of the image light passes through the out-coupling beam splitter along the forward optical path and at least a second portion is redirected out the eyepiece along the reverse optical path.

21. The heads-up display of claim 20 wherein the eyepiece further comprises:
   a half-wave plate retarder positioned in the forward optical path between the first polarizing beamsplitter and the out-coupling beam splitter; and
   a quarter-wave plate retarder positioned in the forward and reverse optical paths between the out-coupling beam splitter and the end reflector.

22. The heads-up display of claim 21 wherein the out-coupling beam splitter comprises a second polarizing beamsplitter including:
   a first prism including an input face, an output face and an oblique face;
   a second prism including an output face and an oblique face, the oblique face of the second prism being coupled to the oblique face of the first prism;
   a polarizing coating sandwiched between the oblique face of the first prism and the oblique face of the second prism; and
   a linear polarizer coupled to at least one of the output face of the first prism and the output face of the second prism.

23. The heads-up display of claim 20 wherein the out-coupling beam splitter comprises a non-polarizing beam splitter.

24. The heads-up display of claim 20 wherein the display comprises:
- an illumination source to generate lamp light mounted to the first polarizing beamsplitter; and
- a display panel to modulate an image onto the lamp light to generate the image light, the display panel mounted to the first polarizing beamsplitter.

\* \* \* \* \*